Oct. 4, 1932. H. C. NICHOLS ET AL 1,881,223
TIRE CARRIER
Filed May 22, 1930 2 Sheets-Sheet 1
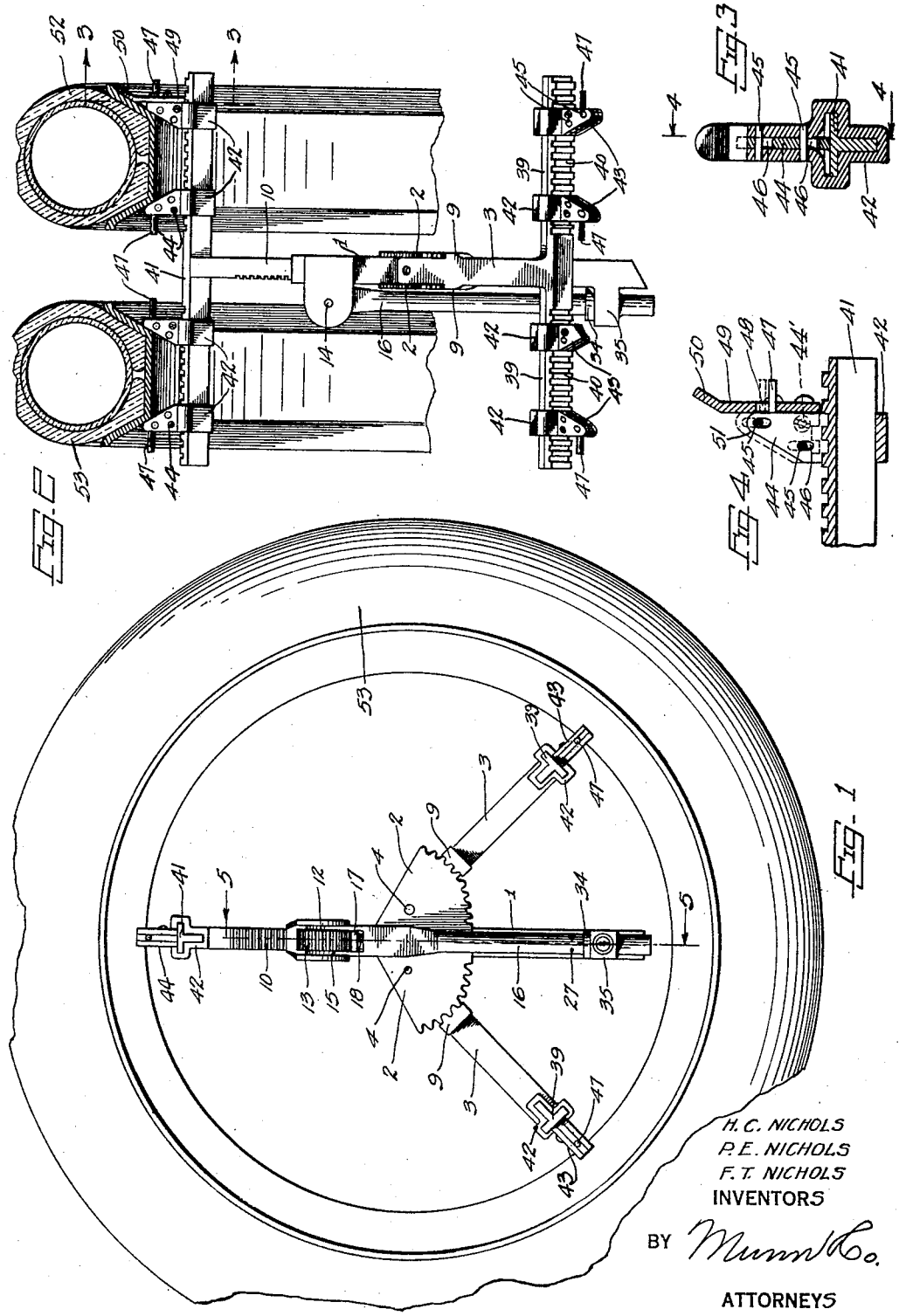
H. C. NICHOLS
P. E. NICHOLS
F. T. NICHOLS
INVENTORS
BY Munn & Co.
ATTORNEYS

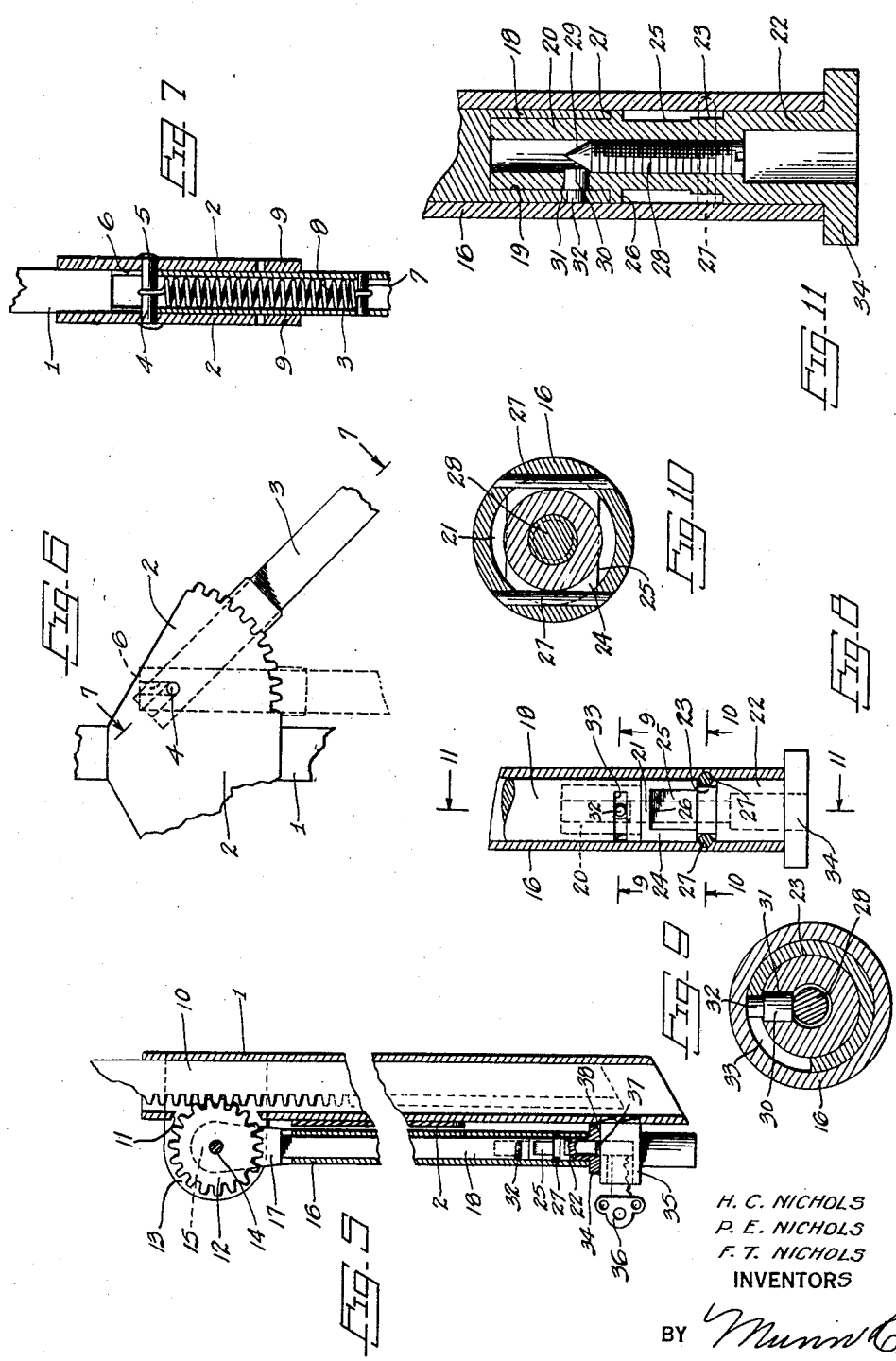

Patented Oct. 4, 1932

1,881,223

UNITED STATES PATENT OFFICE

HENRY CHESTER NICHOLS, PERCY EARNEST NICHOLS, AND FRANK TENNIS NICHOLS, OF CHICKASHA, OKLAHOMA

TIRE CARRIER

Application filed May 22, 1930. Serial No. 454,700.

Our invention relates to improvements in tire carriers and it consists in the combinations, constructions, and arrangements herein described and claimed.

An object of our invention is to provide a tire carrier in which means is provided whereby the tire-holding mechanism may be easily adjusted for accommodating tires of various dimensions as well as diameters.

A further object is to provide a tire carrier in which a novel locking mechanism is provided for preventing the tire from being removed and in which novel means is employed for permitting the locking means to be easily and quickly manipulated.

A further object is to provide a tire carrier in which lever means is provided for expanding the tire carrier and in which the expandible elements are constructed in a novel manner for permitting the elements to be quickly adjusted.

A further object is to provide adjustable tire-engaging lugs in which means is provided for holding the lugs against movement when the lugs engage a tire.

Other objects and advantages will appear in the following specification, and the novel features of the invention will be particularly pointed out in the appended claims.

Our invention is illustrated in the accompanying drawings, forming part of this application, in which Figure 1 is an elevation of our device showing a tire mounted thereon, Figure 2 is a sectional view of our device, showing a pair of tires disposed thereon, Figure 3 is a sectional view taken along the line 3—3 of Figure 2, Figure 4 is a sectional detail view of one of the lugs, Figure 5 is a sectional view taken along the line 5—5 of Figure 1, Figure 6 is a detail view of a portion of the device, Figure 7 is a sectional view taken along the line 7—7 of Figure 6, Figure 8 is a sectional view of the actuating handle or lever, Figure 9 is an enlarged detail view taken along the line 9—9 of Figure 8, Figure 10 is an enlarged sectional detail view taken along the line 10—10 of Figure 8, and Figure 11 is an enlarged sectional detail view taken along the line 11—11 of Figure 8.

In carrying out our invention, we provide a hollow guide member 1, preferably rectangular in cross section. The guide member is provided with a plurality of toothed plates 2. The plates are spaced apart as shown in Figure 2 for receiving legs 3. One end of each of the legs is pivotally mounted between its respective plates 2 by reason of pins or shafts 4. The pins may be riveted as at 5 for providing a permanent construction and insuring safety. The legs 3 are preferably hollow for reducing the weight of the construction. In referring to Figures 6 and 7, it will be noted that the ends of the legs are slotted as at 6 and that the slots receive the pins 4. Since the legs are identical in construction, the description at this time will be confined to a single unit.

In Figure 7 we have shown a pin 7 as being passed through the leg a short distance from the pin 4. A coil spring 8 is secured to the pins 4 and 7. The tension normally holds the leg in engagement with the pin 4. In other words, the spring tends to move the leg in the direction of the pin so that the latter is normally disposed within the bottom of the slot 6. The leg 3 shown in Figures 6 and 7 is provided with toothed members 9 upon two sides and aligned for meshing with the teeth associated with the plates 2. The leg may be moved or pivoted about the axis of the pin 4 when the leg is pulled against the tension of the spring 8 a sufficient distance to move the toothed members 9 out of engagement with the teeth of the plates 2. The spring 8 automatically moves the leg 3 into locking engagement with the plates 2 as soon as the leg is released.

Referring now to Figures 1, 2, and 5, we have shown a sliding rack 10 as being placed within the guide member 1. The guide member is provided with an opening 11 in one of its sides through which a gear 12 projects and is arranged in mesh with the rack 10. The guide member is provided with a pair of lugs 13 between which the gear 12 is disposed. The gear is disposed upon a pin 14 which passes through side members 15 which are connected with one end of a handle or lever 16. The side portions 15 fit snugly between the lugs 13. The handle is preferably hollow and circular in cross section. Other shapes may of course be employed without departing from the spirit of the invention. The handle is arranged to be moved toward and away from the guide 1 about the axis of the pin 14. The handle is arranged to be connected with or disconnected from the gear 12 through the medium of a toothed head 17 carried by a rod 18 which is slidably disposed within the handle 16. The head 17 is arranged to be moved toward or away from the gear 12.

The rod 18 is provided with an opening 19, see Figure 11, in its opposite end for receiving one end of a rotatable member 20. The rotatable member is provided with a shoulder 21 which engages the end of the rod 18. The rotatable member 20 is provided with an enlarged portion 22 having a groove 23 formed therein. The groove provides a portion 24, one end of which constitutes the shoulder 21. The portion 24 is flattened upon opposite sides, as at 25. The flattened portions 25 terminate at 26 for providing shoulders which engage stop members 27, as will be explained later.

The rotatable member is provided with a central opening which is preferably threaded in part for receiving a locking bolt 28 which has threaded relation with the threaded opening. The bolt is provided with a tapered end 29 for engaging a pin 30 slidably disposed within an opening 31 in the rotatable member 20. The pin is provided with a reduced portion 32 which projects through a slot 33 in the end of the rod 18. In referring to Figure 9, it will be noted that the slot permits a rotation of the rotatable member 20 a certain distance. When the rotatable member is rotated its maximum distance in one direction, the faces 25 are arranged substantially at right angles to the longitudinal axes of the pins 27. At this time the rotatable member 20 is held against longitudinal movement. The pin 30 is the connecting member between the rotatable member 20 and the rod 18 with respect to the longitudinal movement of the rod. The rotatable member may of course be rotated independently of the rod 18 and the rod is held against rotation by reason of the head 17 which engages certain portions of the handle 16.

When the rotatable member 20 is rotated for aligning the faces 25 with respect to the stop element 27, the rotatable member may be moved longitudinally, together with the rod 18, a distance substantially equal to the length of the faces 25. At this time the shoulders 26 will engage the stop elements 27. This movement permits the rod 18 to be moved a sufficient distance to disengage the head 17 from the gear 12. In other words, the handle 16 may at this time be moved independently of the gear. The rotatable member is provided with a flange 34 which normally bears against the end of the handle 16 as shown in Figures 8 and 11. The guide 1 is provided with a housing 35 provided with a suitable key-actuated mechanism which may be manipulated through the medium of a key 36 for withdrawing the end of a spring-pressed pin 37 from engagement with the rotatable member 20, see Figure 5. Since the key-actuated mechanism per se forms no part of the present invention, and in view of the fact that any standard mechanism may be employed, no description is necessary. The pin 37 is slightly rounded at its outer end so that the handle 16 may be moved in the direction of the guide 1, whereby the inclined edge 38 of the flange 34 moves the pin 37 downwardly until the pin is aligned with the opening in the member 20. At this time the pin automatically moves within the opening, whereby the handle is locked against movement until the pin has been released through the medium of the key.

Each of the legs 3 is provided with a cross member 39 having teeth 40 upon one face. The rack 10 is also provided with an identical cross member 41. Each of the cross members is provided with a plurality of movable lugs 42. Since all of the lugs are identical in construction, the description at the present time will be directed to a single unit, particularly as shown in Figures 3 and 4.

The clamp comprises a strap of material bent to form a loop conforming to the shape of the cross member 41. The ends of the strap are tapered as at 43 and arranged in spaced-apart relation for receiving a toothed element 44. The latter is arranged for engaging the teeth of the member 41. A pair of rivets or pins 45 rigidly support the ends of the straps in spaced-apart relation and pass through slots 46 in the element 44. The construction is such that the element may be lifted as indicated in dotted lines in Figure 4 for moving the teeth of the element out of engagement with the teeth of the member 41. The element 44 is provided with a gripping pin 47.

One of the lugs is provided with an extension 49 which may be riveted or otherwise secured to the edges of the strap forming that particular lug. The extension is preferably provided with an end portion 50 bent to form a portion arranged in alignment with the inclined edges 43. When the element 44, associated with this lug, is disposed in mesh with the teeth on the member 41, the inclined edge 51 of the element 44 is aligned with the inclined edges 43. The extension 49 may be provided with a slot 48 through which the pin 47 projects. When the element 44, associated with any one of the lugs, is lifted out of engagement with the teeth on the members 39 or 41, the inclined edges project a slight distance beyond the inclined edges 43.

The extension 49 is arranged to hold the tire carrier upon the rim of the first tire when the tire carrier is contracted. At this time, the tire 53 may be removed. When this tire has been removed, the tire carrier may be removed from the tire 52 by lifting the tire carrier upwardly and swinging the bottom of the tire carrier outwardly.

The gripping pin 47 facilitates the moving of the element 44 out of engagement with the cross member. When the element 44 has been moved free from the cross member, the lug may be moved along the latter. Thus it will be seen that two of the lug elements may be moved toward or away from each other for accommodating tires or rather the rims associated with the tires for various sizes of wheels. The relation between the units of two lugs is shown in Figure 2.

Each of the lugs 42 is provided with a threaded opening for receiving a set screw 44' which may be moved into engagement with the toothed element 44 whereby said toothed element may be held in locking engagement with the cross member for fixedly positioning the lug 42 with respect to said cross member.

From the foregoing description of the various parts of the device, the operation thereof may be readily understood. The rack 10 may be actuated through the medium of the handle 16. Normally, the handle is locked against movement by reason of the pin 37 shown in Figure 5. When it is desired to move the rack, the key 36 may be employed for releasing the handle, at which time a pivotal action of the handle will cause a relative movement of the rack. In Figure 2 we have shown a pair of tires as being associated with the tire carrier. The tire carrier may be secured to a spare, which is carried upon the rear of a vehicle. This tire is indicated at 52. A second spare may then be placed upon the tire carrier, as indicated by the tire 53. It will be noted in referring to Figure 2 that when a tire is firmly supported by the lugs, the rim of the tire engages the inclined edges 43 in such a manner that the element 44 in each of the lugs is firmly held in mesh with the teeth associated with the members 39 and 41. The lugs may be adjusted with respect to each other for accommodating the lugs to different sizes of tires, and when the tire is placed upon the lugs and the device expanded through the medium of the handle 16, the lugs will at the same time become locked. It is impossible to move the lugs again until the tire has been removed therefrom.

The tire carrier is expanded when the handle 16 is in its locked position, as shown in Figures 2 and 5. When it is desired to remove a tire from the carrier, the handle may be unlocked and raised, at which time the rack 10 will be moved inwardly with respect to the guide 1. The rack moves a sufficient distance for permitting the tire to be removed from the lugs. The rack may be freed in a different manner by manipulating the rotatable member 20 shown in Figures 8 and 11.

As soon as the handle has been moved free from the pin 37, the rotatable member 20 may be rotated sufficiently far to bring the faces 25 into alignment with the pins 27. At this time the rod 18 may be moved sufficiently far to bring the head 17 out of engagement with the gear 12. When the device is positioned as shown in Figures 1 and 2, the rack will of course drop of its own weight. An important feature in this connection is the fact that various adjustments may be made between the handle 16 and the gear and rack construction so that accurate operation is attained. A further important feature is the fact that the legs 3 may be adjusted easily. The construction is a flexible one. In addition to this, the legs may be adjusted whereby the tire carrier is provided with a maximum of adaptation.

We claim:

1. A tire carrier comprising a body portion, a toothed plate member mounted on the body portion, a pair of leg members movably connected with said plate member, said leg members having toothed flange portions adapted for engaging the teeth of said plate member, a movable rack carried by the body portion, a pinion carried by the body portion and in engagement with the rack, a movable lever arm carried by the body portion and provided with a pinion engaging member movable with respect to the lever arm, locking means associated with the body portion and the lever arm for fixedly positioning said lever arm with respect to the body portion, said pinion engaging member being operatively associated with the locking means whereby the same may be held in fixed engagement with said pinion, cross arm portions connected with said leg members and rack, jaw members movably mounted on the cross arm portions, and locking members movably connected with the jaw members and adapted for engaging the cross arm portions whereby said jaw members may be fixedly connected with said cross arm portions.

2. A tire carrier comprising a body portion, a toothed plate member mounted on the body portion, a pair of leg members movably connected with said plate member, said leg members having toothed flange portions adapted for engaging the teeth of said plate member, a movable rack carried by the body portion, a pinion carried by the body portion and in engagement with the rack, a movable lever arm carried by the body portion and provided with a pinion engaging member movable with respect to said lever arm, locking means associated with the body portion and the lever arm for fixedly positioning said lever arm with respect to the body portion, said pinion engaging member being operatively associated with the locking means whereby the same may be held in fixed engagement with the pinion, cross arm portions connected with said leg members and rack and provided with teeth, jaw members slidably disposed on said cross arm portions and comprising in part spaced-apart flange portions, and locking members slidably connected with the flange portions and positioned therebetween, said locking members having toothed portions adapted for engaging the teeth of said cross arm portions whereby the jaw members may be fixedly positioned with respect to said cross arm portions.

3. A tire carrier comprising a tubular body portion, a pair of plate members mounted on opposite sides of the body portion and having arcuate shaped edges provided with teeth, a pair of leg members disposed on opposite sides of the body portion and positioned between the plate members, said leg members being pivotally and slidably connected with said plate members, flange portions connected with said leg members and provided with teeth normally in engagement with the teeth of said plate members, a toothed bar member slidably disposed within the body portion, a pinion rotatably mounted on the body portion and in mesh with the teeth of said bar member, a tubular lever arm pivotally mounted on the body portion, a rod member slidably disposed within the lever arm and provided with a toothed flange portion adapted for engaging said pinion, a lock connected with the body portion and operatively associated with the rod member and lever arm whereby the lever arm and the toothed flange portion associated with the rod member may be retained in fixed positions, means associated with the rod member and lever arm whereby the toothed flange portion may be moved out of engagement with the pinion, cross arm portions connected with said leg members and bar member, jaw members movably mounted on the cross arm portions, and locking members movably connected with the jaw members and adapted for engaging the cross end portions whereby said jaw members may be fixedly connected with said cross arm portions.

4. A tire carrier comprising a tubular body portion, a pair of plate members mounted on opposite sides of the body portion and having arcuate shaped edges provided with teeth, a pair of leg members disposed on opposite sides of the body portion and positioned between said plate members, said leg members being pivotally and slidably connected with said plate members, flange portions connected with said leg members and provided with teeth normally in engagement with the teeth of said plate members, a toothed bar member slidably disposed within the body portion, a pinion rotatably mounted on the body portion and in mesh with the teeth of said bar member, a tubular lever arm pivotally mounted on the body portion, a rod member slidably disposed within the lever arm and provided with a toothed flange portion adapted for engaging said pinion, a lock connected with the body portion and operatively associated with the rod member and lever arm whereby the lever arm and the toothed flange portion associated with the rod member may be retained in fixed positions, means associated with the rod member and lever arm whereby said toothed flange portions may be moved out of engagement with the pinion, said leg members and bar member being provided with cross arm portions provided with teeth, jaw members slidably disposed on said cross arm portions and comprising in part spaced-apart flange portions, and locking members slidably connected with the flange portions and positioned therebetween, said locking members having toothed portions adapted for engaging the teeth of said cross arm portions whereby the jaw members may be fixedly positioned with respect to said cross arm portions.

5. In a tire carrier the combination of a cross arm portion provided with teeth, jaw members slidably disposed on said cross arm portions and comprising in part spaced-apart flange portions, locking members slidably connected with the flange portions and positioned therebetween, said locking members having toothed portions adapted for engaging the teeth of said cross arm portions whereby the jaw members may be fixedly positioned with respect to said cross arm portions.

Signed at Chickasha, Oklahoma, in the county of Grady and State of Oklahoma this 22nd day of April, A. D. 1930.

HENRY CHESTER NICHOLS.
PERCY EARNEST NICHOLS.
FRANK TENNIS NICHOLS.